Figure 1:
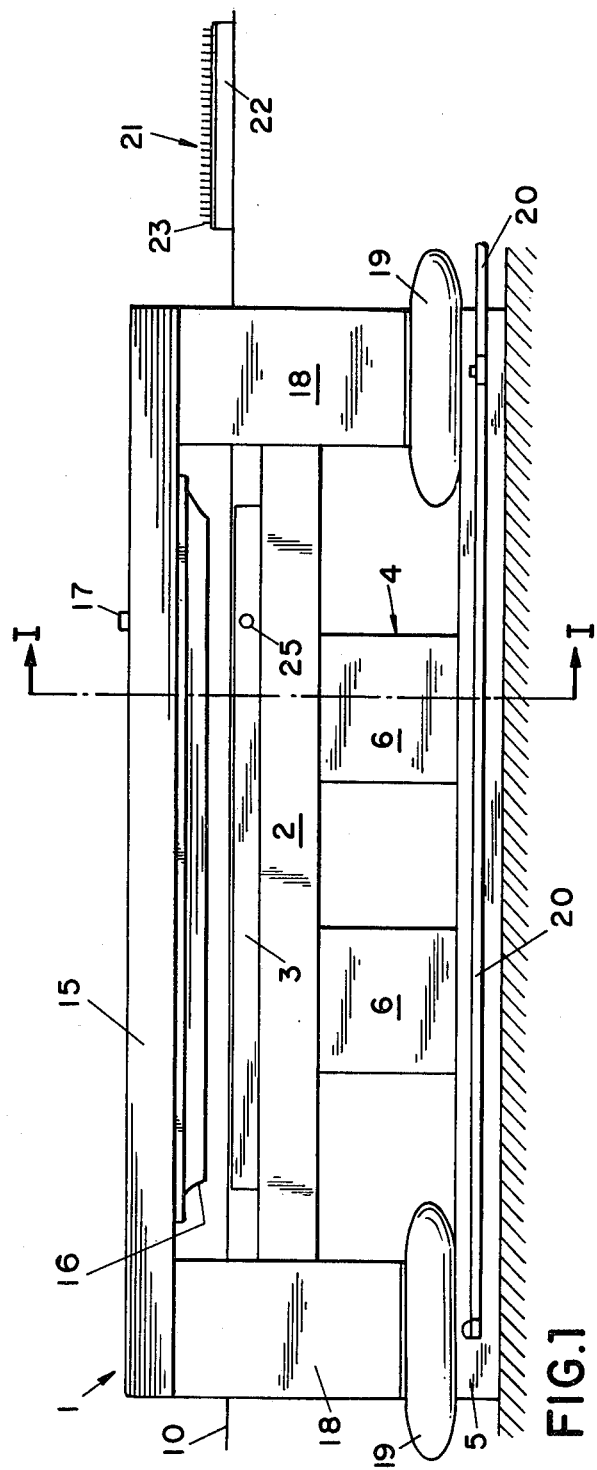

United States Patent [19]

Knudsen

[11] 4,447,201

[45] May 8, 1984

[54] VULCANIZING PRESS FOR VULCANIZING FLAT ARTICLES

[75] Inventor: Poul H. Knudsen, Beder, Denmark

[73] Assignee: Clean-Tex A/S, Morke, Denmark

[21] Appl. No.: 278,572

[22] Filed: Jun. 29, 1981

[51] Int. Cl.³ .................. B28B 11/00; B28B 7/32; B29C 17/00; B29C 17/06

[52] U.S. Cl. ........................... 425/397; 264/314; 425/389; 425/445

[58] Field of Search ............ 425/397, 445, 389; 264/314

[56] References Cited

U.S. PATENT DOCUMENTS

| | | | |
|---|---|---|---|
| 3,575,756 | 4/1971 | Maus | 428/116 |
| 3,999,912 | 12/1976 | Hall | 425/389 |
| 4,104,101 | 8/1978 | Garabedian | 264/109 |
| 4,156,589 | 5/1979 | Schmitt et al. | 425/389 |
| 4,233,261 | 11/1980 | Mijnheer | 425/389 |
| 4,312,823 | 1/1982 | Kraakman et al. | 425/389 |
| 4,350,545 | 9/1982 | Garabedian | 264/112 |

Primary Examiner—H. S. Cockeram
Attorney, Agent, or Firm—Earle R. Marden; H. William Petry

[57] ABSTRACT

A vulcanizing press for vulcanizing flat articles having locking pawls for locking the pressing plates of the press at a certain distance from each other in the closed vulcanizing position of the press. By letting one of the pressing plates being without heating elements and carrying an inflatable member such as a membrane driven by a pressure fluid which membrane in the closed position of the press is positioned and adapted to supply a uniform pressure substantially over the whole flat side of the vulcanizing article positioned between the pressing plates is obtained an even surface pressure all over the textile side of the vulcanizing article substantially independent of the thickness of the article and without use of toggle mechanisms or high power hydraulic cylinders. When the inflatable member is placed at the downwardly faced side of the upper pressing plate the articles can be conveyed into the press on a conveyor belt, the path of which is stationary relative to the press frame, but if the inflatable member is placed at the upwardly faced side of a lower pressing plate being without heating elements the difference of the temperature between the upwardly turned side of the articles and the downwardly faced side of the upper pressing plate can be increased whereby the last mentioned article textile side can be of a less temperature resistant material.

6 Claims, 7 Drawing Figures

VULCANIZING PRESS FOR VULCANIZING FLAT ARTICLES

The present invention relates to a vulcanizing press for vulcanizing flat articles, such as rubber backings on textile mats, and of the type consisting of a lower pressing plate, an upper pressing plate, which pressing plates are mutually displaceable towards and away from each other, a press frame which supports one of the pressing plates, a guide and driving means for the displaceable movement of the other pressing plate between a closed vulcanizing position and an open position for insertion of basic materials and removal of finished vulcanized articles, and perhaps a conveyor means for feeding basic materials and for removal of the finished articles between the pressing plates, one of which being adapted to be heated by heating elements.

The vulcanizing press according to the invention is characterized in the pressing plates having locking means which, in the closed vulcanizing position of the press, is adapted to lock the pressing plates in a predetermined distance from each other, and that the pressing plate, being without heating elements on a side thereof facing the other pressing plate, carries an inflatable member which is able to be inflated by means of a pressurized fluid, which member, in the closed position of the press, is positioned and adapted to perform a uniform pressure directly on substantially the whole flat side of the article, when the article is positioned between the pressing plates. Hereby is obtained with rather simple means a vulcanizing press for vulcanizing flat articles, such as textile mats with a rubber backing as there is no need for using pressurized fluid of high pressures to the very pressing pressure during the vulcanizing. This is due to the fact that the locking members transfer the high pressing forces between the pressing plates while the inflatable member supplies the uniform pressure against the article which is to be vulcanized. Consequently there is no need to use an expensive toggle press or hydraulic cylinders at high fluid pressures for obtaining the surface pressure nenessary for the vulcanizing process. Furthermore the flat articles which are to be vulcanized in the press need not have a specially uniform thickness as is the case with the presses known so far as the inflatable member in its surface of contact against a flat article to be vulcanized is resilient so as to be able to adapt itself to the surface contour and local thickness of the article without the local surface pressure being increased in the thickest zones of the article and decreased in its thinnest zone. This has a special importance where vulcanizing pressing of textile mats with rubber backing is concerned, as too excessive local surface pressure can destroy the textile structure, as this structure at rather high vulcanizing temperatures easily will be burnt, if the surface pressure becomes too elevated.

According to the invention many forms of inflatable members can be used in the vulcanizing press. A characteristic feature of them all is that on the side which is to abut the textile side of the vulcanizing article they are made of a material which is able to follow the surface form of the article and is able to uniformly transfer the pressure of the pressurized fluid. In a preferred embodiment, the inflatable member includes a fluid-pressure box which, on its side facing, the other pressing plate, is closed by a flexible, possibly elastically yieldable membrane which is sealingly fastened to the fluidpressure box and that the interior of the box behind the membrane is adapted to be connected to a pressurized fluid source and, possibly, to a vacuum source. Thereby the movement and the pressure of the inflatable member can be accurately controlled. The movement of the membrane towards the article can take place by means of a supply of pressurized fluid of a certain pressure value, and the returning of the membrane can take place by means of its own weight or by replacing the pressurized fluid by a vacuum.

According to the invention a spacer member permeable by a pressurized fluid can be placed behind the membrane along its entire length for maintaining a small distance between the bottom of the fluidpressure box and the rear side of the membrane. This is expedient, especially if a very small membrane travel or motion is desired whereby a substantially planar membrane can be used. The permeable spacer member is able to transfer a predetermined small surface pressure during the closing of the press and to prevent forming of pockets or voids of fluid between the membrane and the bottom of the box. Without a spacer member such pockets would be able to prevent the pressurized fluid pressure in being evenly distributed all over the membrane surface if the travel of the membrane between its active position and its resting position was too small.

Instead of inflatable member of the aforementioned type, the member can be constituted by a radially inflatable and contractable hose which is placed on the other pressing plate for establishing a layer formed of the hose in more abutting loops or bights. By pressurizing the interior of the hose this will attempt to change its form from its pressureless condition, which condition can be circular or flattened, to a circular or oval inflated condition, if possible in connection with elastical expansion of the hose wall in the circumferential direction. Such a hose can abut the article directly or indirectly via a flexible or pliable membrane or sheet attached to the outermost side of the hose formed layer. Whether the surface of contact of the inflatable member against the article is constituted by a hose or a membrane a flexible or pliable textile sheet or foam plastic sheet can furthermore be positioned between the article and the inflatable membrane for further absorption of the thickness differences of the article and distribution of the pressure of the pressurized fluid over the flat textile side of the article.

In a preferred embodiment the lock members consist of U-formed yokes placed at the opposite side edges of the pressing plates, where the bottom of the U extends perpendicular to the pressing plates, and the branches of the U extend along the rear surfaces of the pressing plates, which surfaces are turned away from each other, and of wedges or locking pawls operated by drive members, such as linear motors, the wedges or locking pawls being positioned between a U-branch and its adjacent pressing plate in the closed vulcanizing position of the press.

The pressing plate without the heating elements can expediently constitute the horizontal lower pressing plate, which by drive members is vertically displaceable, while the other pressing plate with yokes can constitute a stationarily positioned upper pressing plate, where the wedges or the locking pawls are positioned horizontally displaceably under the lower pressing plate. In this way it is avoided that the upward flow of heat from the heat element provided pressing plate can influence the inflatable member with an unnecessary high temperature, and that a minor part of the effect of the heater elements is wasted by convection loss to the air in the gap or press chamber between the pressing plates. The heated air in the press chamber can be kept here by placing a downwardly directed heat insulating shell or skirt around and along the circumference of the upper pressing plate. The pressing plate without the heating elements can of course also constitute the horizontal upper pressing plate, which only involves increased requirements to the temperature resistance and to the non-ageing qualities of the material of which the inflatable member consists, but, on the other hand, is obtained that a feeding member for the articles for vulcanizing in the press can be stationarily kept in the same level during the entire pressing operation, while this feeding member during the pressing operation where the pressing plate without the heating elements constitutes the lower pressing plate will be exposed to a vertical displacement in the zone of the pressing plates during the pressing operation in cases where the heat element provided press plate is to be stationary.

Figure 2:
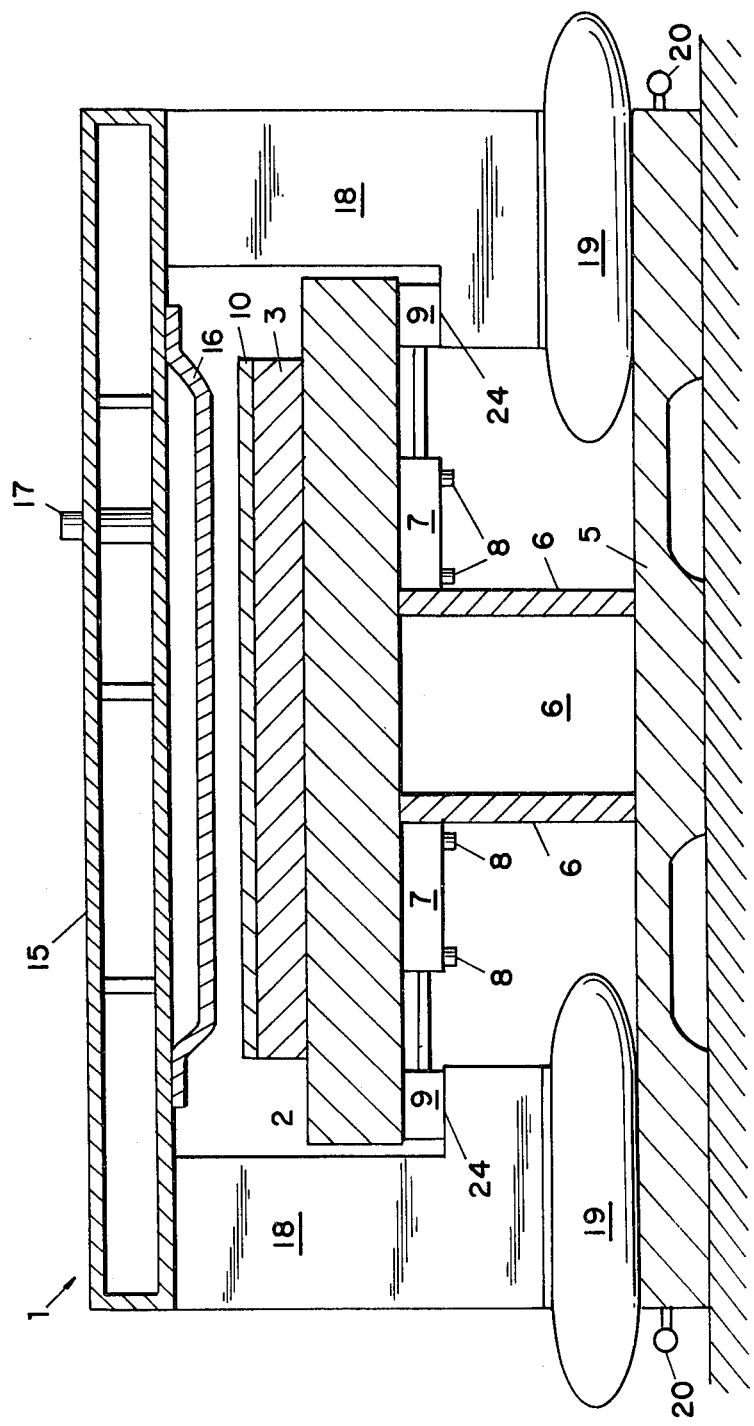
Figure 3:
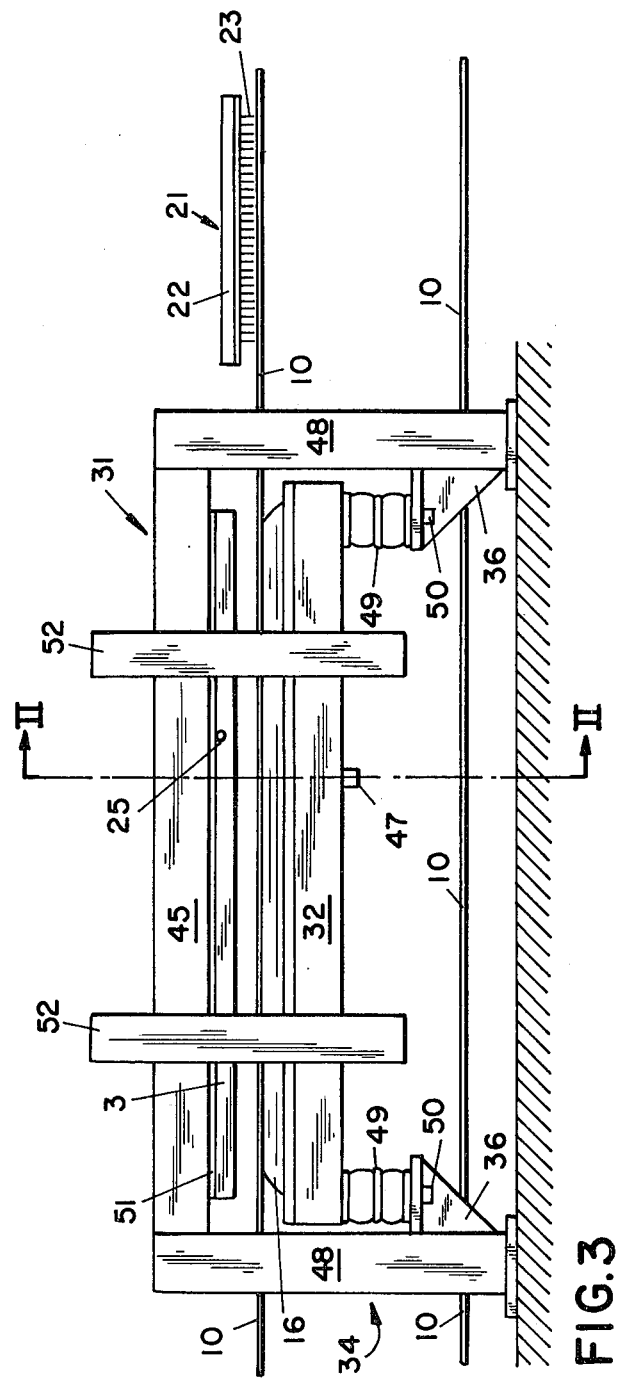
Figure 4:
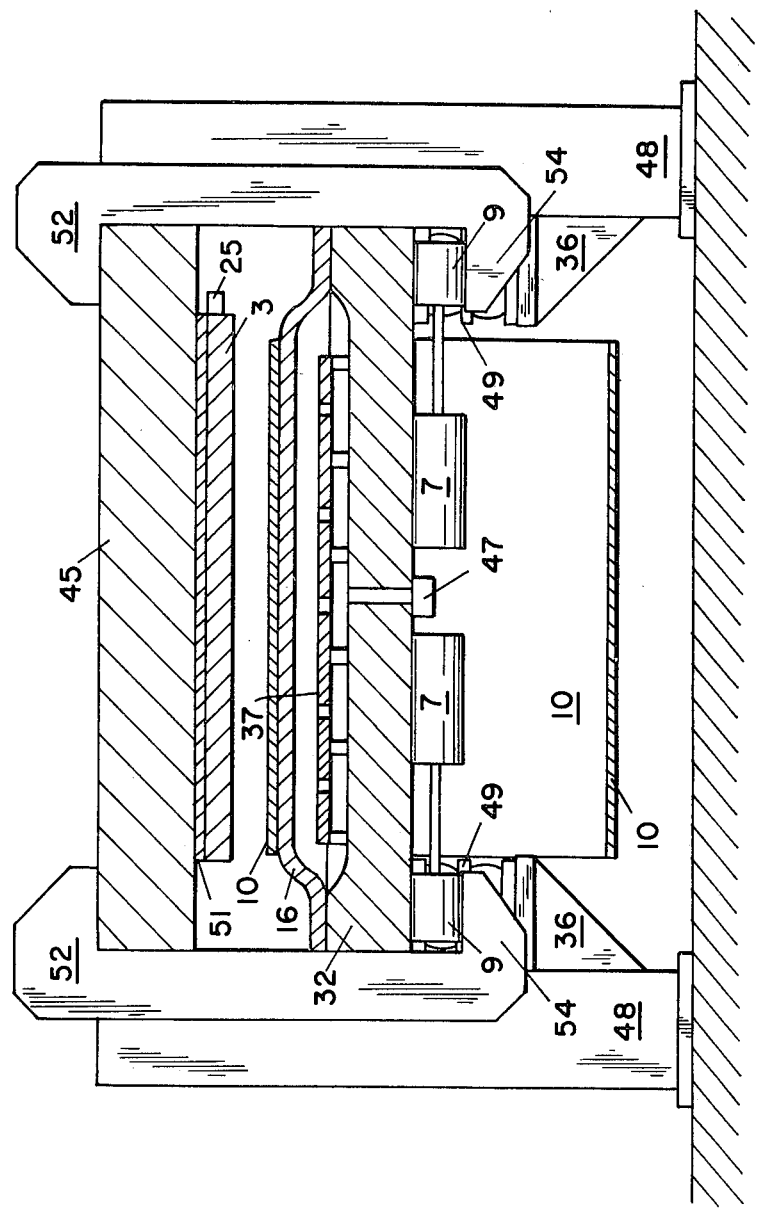
Figure 5:
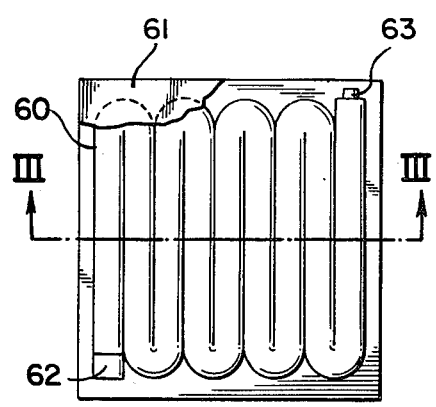
Figure 6:
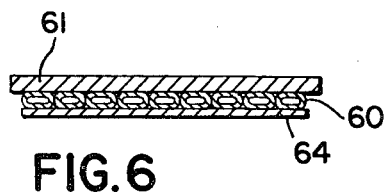
Figure 7:
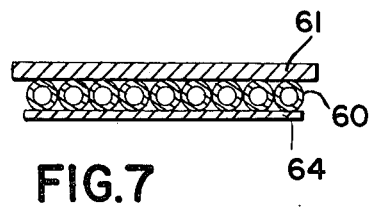

The invention will in the following be further explained in connection with some embodiments and with reference to the drawings, in which:

FIG. 1 is a side elevational view of a vulcanizing press where the upper pressing plate is free of heating elements, FIG. 2 is a cross-sectional view taken along the line I—I of the press shown in FIG. 1, FIG. 3 is a side elevational view of another embodiment of the vulcanizing press where only the lower pressing plate is free of heating elements, FIG. 4 is a cross-sectional view taken along the line II—II of FIG. 3, FIG. 5 is a plan view of a pressing plate free of heating elements and with an inflatable member in the form of a hose, FIG. 6 is a cross-sectional view taken along the line III—III in FIG. 5, where the side of the hose formed layer turned against the articles to be vulcanized is provided with a flexible membrane, and where the hoses are in a partly flattened condition, and FIG. 7 is a cross-sectional view similar to FIG. 6 except that the hose is in an inflated condition and the hose wall is elastically expanded in the circumferential direction.

FIGS. 1 and 2 show a vulcanizing press generally designated by the reference numeral 1 with a lower pressing plate 2 which carries a heating plate 3 which in its entire extent is provided with a heater element.

A press frame generally designated by the reference numeral 4 including a bed plate 5 and supporting columns 6 carries the lower pressing plate 2 at the top of the columns 6. The lower pressing plate 2, on an underside thereof carries a number of pressurized fluid cylinders 7 which have pressurized fluid connections 8 and are adapted to displace their respective locking pawl or wedge 9 at a low fluid pressure between an inactive and an active position. Along the top side of the heating plate 3 is placed a conveyor belt 10 for the inlet or feeding of basic materials to be vulcanized in the vulcanizing press 1 and the outlet or removal of the vulcanized articles from the vulcanizing press 1.

The upper pressing plate 15 is positioned above the lower pressing plate 2 and carries on its underside an inflatable member 16 which, by a controlled inlet or outlet of the pressurized fluid via a connecting branch 17, can be inflated to an active position as shown in FIGS. 1 and 2 or can be drawn back to an inactive position at a larger distance from the conveyor belt 10 and the heating plate 3. The upper pressing plate 15 is carried by posts 18, which, in turn, is carried by bellows cylinders 19 which are resting on the bed plate 5. The bellow cylinders 19 are supplied with a pressurized fluid via fluid tubes or hoses 20 connected to the interior of the bellow cylinders 19. When an article generally designated by the reference numeral 21 to be vulcanized is placed on the conveyor belt 10 outside the vulcanizing press 1 the article 21 can be conveyed between the pressing plates 2,15 via the conveyor belt 10, when the fluid cylinders 7 have moved their locking pawls 9 to their inactive position, the bellow cylinders 19 have received a pressurized fluid and have lifted the posts 18 and thereby the upper pressing plate 15 with the inflatable member 16 drawn back to its inactive position. For the sake of clarity the article 21 is not shown between the pressing plates, 2,15 in the drawing. The article 21 to be vulcanized may for example be made up of a rubber backing 22 and a textile part 23, where it is desired to have the rubber backing vulcanized onto the textile part 23. After the article 21 has been conveyed into the press chamber between the pressing plates, i.e. between the heating plate 3 and the inflatable member 16, which in FIGS. 1 and 2 is made as a membrane, the upper pressing plate 15 is lowered by exhausting of the bellow cylinders 19, and the upper pressing plate 15 is locked relative to the lower pressing plate 2 by insertion of the pawls 9 between the projections 24 and the posts 18 below the lower pressing plate 2 and the very lower pressing plate 2, as the pressure fluid cylinders 7 are provided with a pressurized fluid via a pressure fluid connection 8 for displacement of their respective locking pawls 9 to the active positions, whereupon a possible partial vacuum behind the membrane 16 is replaced by a positive pressure which is supplied via a connecting branch 17. After the article 21, during a certain vulcanizing time, has been fixed between the membrane 16 and the heating plate 3, supplied with steam or electric current via one or more energy connections 25, the rubber backing 22 has been vulcanized on the textile part 23, and the article 21 can be removed from the press 1 by means of the conveyor belt 10 after the positive pressure behind the membrane 16 has been removed and, if possible, replaced by a partial vacuum, the locking pawls 9 of the cylinders 7 have been moved to their inactive position, and the upper pressing plate 15 has been elevated by pressure fluid supply to the bellow cylinders 19 via their fluid tubes or hoses 20. As an example of typical working conditions, the temperature of the heating plate 3 can be about 180° C., the surface pressure and the inner positive pressure supplied by the membrane 16 can be about 3 bar, while the treatment time for the vulcanizing article under press 1 between the pressing plates 15 and 2 can be 4-5 minutes, depending of the chosen rubber mixture in the rubber backing 22. A preferred rubber mixture has a low fluidity, a high elasticity, a low modulus and is quickly vulcanizing.

Instead of being fixed directly to the upper pressing plate 15, the membrane 16 can be fixed to a frame, which is fixed to the upper pressing plate 15. Instead of the shown membrane 16, which is designed with inclined edge parts, a completely plane membrane can be used which will be cheaper to produce. Behind the membrane 16, along its entire length a pressure fluid permeable spacer member 16 can be disposed for maintaining a small distance between the rear side of the membrane and the opposite side of the membrane chamber. When the press 1 is closed such a spacer member will prevent establishment of pressure fluid pockets or voids such as air pockets in the inner of the membrane chamber as in its closed position the press 1 can cause the membrane 16, via the inserted article 21, to be pressed against the opposite wall of the membrane chamber, whereby the pressure fluid, which is supplied through the connecting branch 17, can be prevented in passing into thereby closed parts of the membrane chamber. Such a spacer member will be further described in connection with FIG. 4.

The conveyor belt 10 is made of a heat resistant material of a nature or thickness which does not, to any appreciable extent, prevents a heat transfer from the heating plate 3 to the article 21. This conveyor belt 10 can be adapted to be unwound from a storage roll and to be wound around another roll, but can also be of an endless type, whereby the supporting columns 6 then will have to be removed from their position shown in FIGS. 1 and 2 to a position along the side edges of the lower pressing plate.

The feeding of the articles 21 can take place from one end of the press 1, with an outlet or removal at its other end, but the feeding can also take place from both ends with outlets or removals at both ends if a reciprocable conveyor belt is used. In the last mentioned case the length of the conveyor belt can be more than halved.

In FIGS. 3 and 4 a press generally designated by the reference numeral 31 is provided wherein the placing of the inflatable member 16 and the heating plate 3 has been modified. The press 31 includes lower pressing plate 32 carrying the inflatable member 16, which in FIGS. 3 and 4, again is a membrane shown in its active position, i.e. with a positive pressure in its membrane chamber from a pressure fluid supplied through a connecting branch 47. The lower pressing plate 32 is supported by membrane cylinders 49 resting on their respective brackets 36 which are placed at the bottom of a press frame generally designated by the reference numeral 34. In the membrane chamber between the membrane 16 and the lower pressing plate 32 is placed a spacer member 37 which is penetrable to the pressure fluid and resistant to compressive force from the membrane 16 in a direction towards the lower pressing plate 32. The spacer member 37 can be a perforated plate with open canals in its side turned towards the lower pressing plate. The press frame 34 consists, in the embodiment of FIGS. 3 and 4 of four posts 48 which at the top stationarily carry the upper pressing plate 45, to which the heating plate 3 is fixed, if possible as shown with an intermediate heat insulating plate 51 which shall be able, firstly, to transfer the high pressing powers and, secondly, to prevent too much heat transfer from the heating plate 3 to the upper pressing plate 43. Around the hot heating plate 3 and fixed to the upper pressing plate 45 can be fastened a shell or skirt (not shown) for preventing excessive heat convection from the heat surface of the heating plate 3.

To the upper pressing plate 45 is fixed a number of yokes 52 which are U-shaped and where the bottom of the U extends perpendicularly to the pressing plates 32,45, the branches of the U extending along the rear sides of the pressing plates 32,45, which rear sides are turned away from each other. The lowermost U-branches 54 are in the lifted position of the lower pressing plate 32, i.e. lifted by the bellow cylinders 39, adapted to cooperate with the locking pawls 9 driven by the pressure fluid cylinders 7 for locking of the pressing plates 32,45 relative to each other in the closed position of the press. For changing the distance between the pressing plates, these yokes 52 can be replaced by yokes with another bottom length, or the locking pawls 9 can be replaced by locking pawls of another dimension.

An article 21 which is to be vulcanized in the press 31, as shown in FIG. 3, is conveyed with the textile side 23 turned downward and the rubber backing 22 turned upward in an unvulcanized condition. The article 21 is conveyed into the press chamber between the pressing plates 45 and 32, to be more explicit between the membrane 16 and the heating plate 3 by means of the conveyor belt 10. This happens in such a condition for the press 31 in which the press has had the pawls 9 drawn out of engagement with the yokes 52, the positive pressure in the membrane chamber has been removed and in which condition the lower pressing plate 32 has been lowered by exhausting of the bellow cylinders 49 which, in this condition, if possible can have their interior connected to a vacuum source via the connecting branches 50. In this condition the lower pressing plate 32 has been lowered with the membrane 16 drawn down, and, in this way, the conveyor belt 10, which rests on the top side of the membrane 16, has also been drawn downwards. When the article 21 has been conveyed by the conveyor 10 into the press chamber between the pressing plates 45,32 the lower pressing plate 32 will be lifted by the bellow cylinders 49, whereby the article 21 and the conveyor belt 10 will be lifted up to abut or almost abut the heating plate 3. The locking pawls 9 are brought to their shown active locking position whereafter a pressure fluid under positive pressure is supplied behind the membrane 16 via the connecting branch 47 from which the pressure fluid is evenly distributed all over the entire rear side of the membrane 16 by means of the spacer member 37 which is only necessary if a risk is involved for establishment of air pockets in the membrane chamber. The pressure behind the membrane 16 presses the article 21 against the heating plate 3 under the required press pressure, such as 2-4 bar positive pressure, and the article 21 is exposed to the required vulcanizing temperature, such as 120°-210° C. dependent of the chosen textile material 23 and rubber backing material 22. The article 21 is exposed to the compression pressure during a certain pressing time, such as 2-10 minutes, preferably 4-5 minutes, whereafter the chamber of the membrane 16 is exhausted or evacuated, the locking pawls 9 are moved back to their inactive position, and the lower pressing plate 32 is lowered by exhausting or evacuating the membrane cylinders 49. The article 21 can then be conveyed out of the press 31 on the conveyor belt 10, if possible simultaneously with the next article 21 being conveyed into the press chamber which is now completely opened. When the inflatable member, such as the membrane 16, is placed on the lower pressing plate 32, the article 21 will have to be positioned with the textile side 23 downwards and the rubber backing 22 upwards, or articles in general must be placed with that side, which is desired to be exposed to the highest vulcanizing temperature, upwards.

The side of the inflatable member or membrane 16, which side is turned against the press chamber, can, if possible, be covered with a foam plastic layer whereby the inflatable member will be able to absorb still larger thickness differences in the articles 21 to be vulcanized with substantially uniform pressing pressure all over the surface of the article 21.

FIG. 5 shows an inflatable member in the form of a hose 60 with a low coefficient of longtiudinal expansion and high coefficient of circumferential expansion. The hose 60 is fixed to a plate 61, e.g. by adhesion, and the plate 61 is fixed to a lower pressing plate 32 or to an upper pressing plate 15, in dependence of which one of the presses in FIG. 1 or FIG. 3 being used. The hose 60 is, at one of its ends, provided with a plug 62 and, at its other end, provided with a connection piece 63 for supplying or evacuating of a pressure fluid. If possible the hose 60 as shown in FIGS. 6, and 7, can be covered with a flexible sheet 64 which can be laminated of several flexible sheets or only one flexible sheet for equalizing the surface pressure of the hose against the vulcanizing article 21. Between the flexible sheet 64 and the hose 60 can be placed wedge-shaped profiles where the individual parts of the hose abut each other, which profiles further equalize the surface pressure provided by the hose 60 to the flexible sheet 64. In a not shown embodiment the hose 60 can also consist of several abutting parallel rectilinear hose pieces positioned side by side, one end of the pieces being connected to a manifold and the other end of which being plugged or connected to another manifold.

What I claim is:

1. A vulcanizing press for vulcanizing flat articles such as rubber backings on textile mats, and of the type consisting of a lower pressing plate, an upper pressing plate, which plates are mutually displaceable against and away from each other, a press frame which supports one of the pressing plates, guides and driving means for the movement of the other pressing plate between a closed vulcanizing position and an open position for insertion and removal of articles to be vulcanized, and optionally a conveying means for conveying the articles in and out between the pressing plates, one of which being adapted to be heated by heat elements, wherein the pressing plates have locking members which in the closed vulcanizing position are adapted to lock the pressing plates at a predetermined distance from each other, and the heat elementless pressing plate on its side turned towards the other pressing plate carries an inflatable member which is inflatable when supplied with a pressure fluid, which inflatable member in the closed position of the press is positioned and inflated to supply a uniform surface pressure substantially over the whole flat side of an article placed between the pressing plates.

2. The press according to claim 1, wherein the inflatable member comprises a pressure box which on its side turned towards the other pressing plate is closed by a resilient flexible membrane, which is sealingly fastened to the pressure box, and the interior of the pressure box behind the membrane is connectable to at least one of a pressure fluid source and a vaccum source.

3. The press according to claim 2, wherein behind the membrane in its entire extent is placed a pressure fluid permeable spacer member for maintaining at least a small distance between the bottom of the pressure box and the rear side of the membrane.

4. The press according to claim 1, wherein the resiliently inflatable member is constituted by a radially inflatable and deflatable hose which is positioned on the other pressing plate for establishment of a layer of the hose in several abutting loops or bights.

5. The press according to claim 1, wherein the locking members consist of U-shaped yokes placed at the opposite side edges of the pressing plates where the bottom of the U extends perpendicularly to the pressing plates, and the branches of the U extend along the rear sides of the pressing plates which rear sides are turned away from each other, and of wedges or locking pawls operated by drive members, the wedges or pawls being placed between a U-branch and its adjacent pressing plate in the closed vulcanizing position of the press.

6. The press according to one of claims 1, 2 or 5, wherein the heat elementless pressing plate inflatable member constitutes the horizontal lower pressing plate which by drive members is vertically displacable, the other pressing plate carrying the yokes constituting a stationarily positioned upper pressing plate, and the wedges or the locking pawls being horizontally displaceably positioned below the lower pressing plate.

* * * * *